Figure 1:
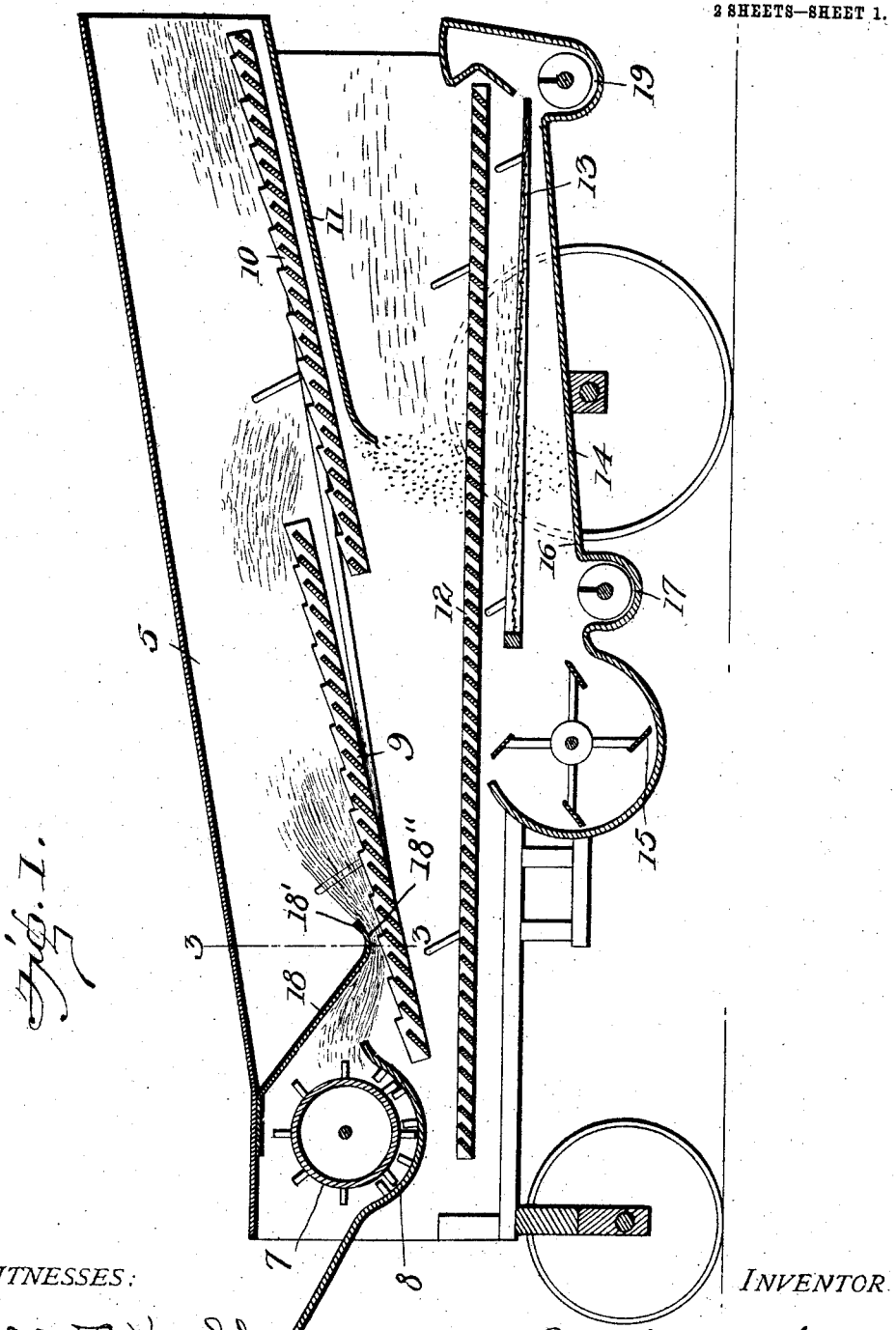

No. 882,763. PATENTED MAR. 24, 1908.
G. KLEIN.
THRESHING MACHINE.
APPLICATION FILED JUNE 6, 1907.

2 SHEETS—SHEET 1.

WITNESSES: INVENTOR
George Klein.
By Attorneys

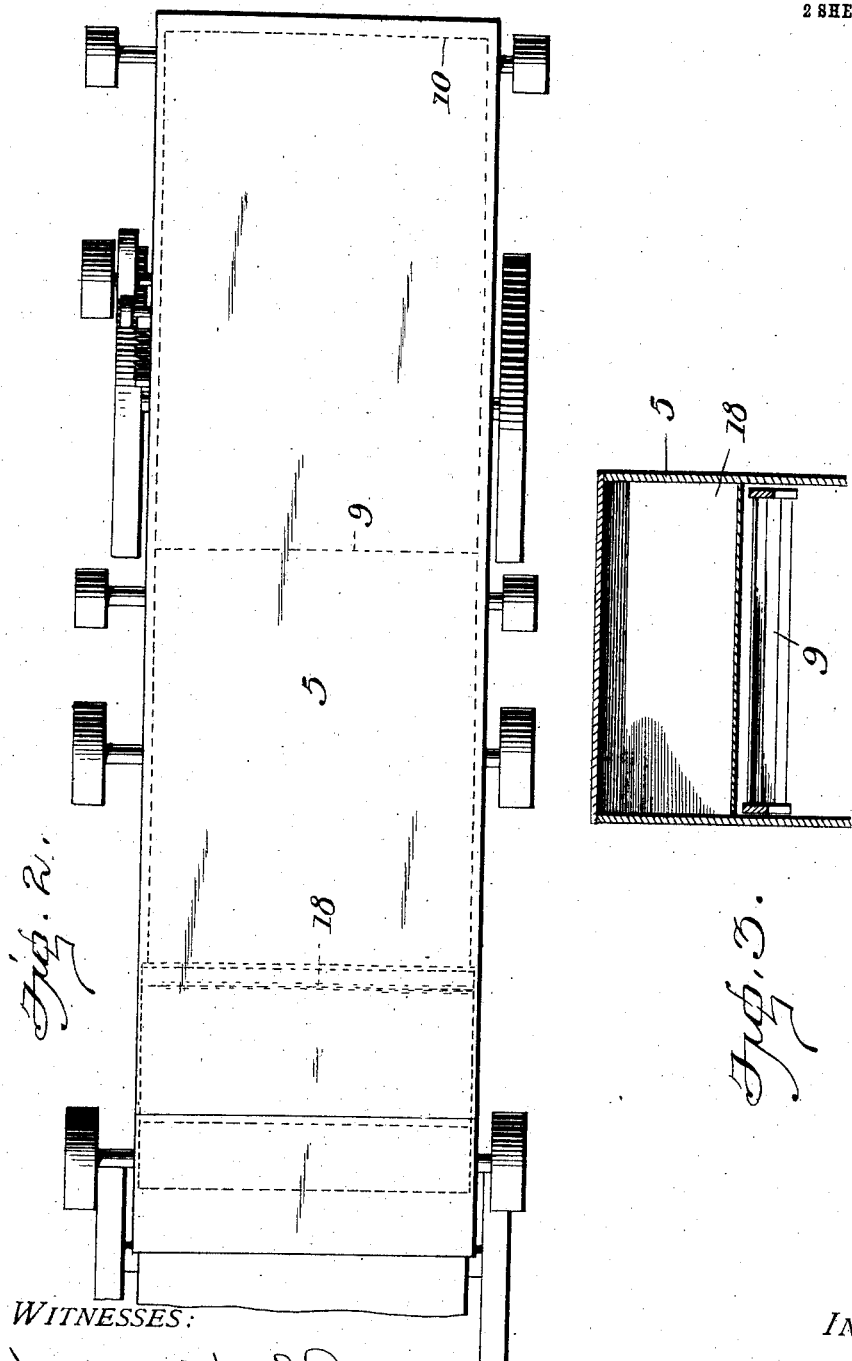

UNITED STATES PATENT OFFICE.

GEORGE KLEIN, OF MEDINA, NORTH DAKOTA.

THRESHING-MACHINE.

No. 882,763.  Specification of Letters Patent.  Patented March 24, 1908.

Application filed June 6, 1907. Serial No. 377,526.

*To all whom it may concern:*

Be it known that I, GEORGE KLEIN, a citizen of the United States, residing at Medina, in the county of Stutsman and State of North Dakota, have invented certain new and useful Improvements in Threshing-Machines, of which the following is a specification.

This invention relates to threshing machines, and has for its object to provide a machine of this nature which will be extremely simple and which will be constructed to separate the loose grain from the straw without the use of beaters or other similarly operating mechanism.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a longitudinal section through a threshing machine constructed in accordance with the present invention, Fig. 2 is a top plan of the mechanism, Fig. 3 is a section on line 3—3 of Fig. 1 showing the retarding plate.

Referring now to the drawings, the present invention comprises a body portion 5, in the forward portion of which there is mounted a transversely extending threshing cylinder 7 having a concave 8 located therebelow.

An upwardly and rearwardly inclined shaker 9 is arranged to receive straw from the rearward side of the concave, and a second similarly arranged shaker 10 is arranged to receive straw from the rearward end of the shaker 9. Located beneath the shaker 10 there is a downwardly and forwardly inclined grain return pan 11 discharging upon a longitudinally reciprocating bed 12 arranged to discharge upon a sieve 13. A trunk 14 contains the sieve 13, the latter being also mounted for reciprocating motion, and located at the forward end of the trunk there is a blower 15. The trunk has a downwardly and forwardly extending bottom 16 emptying into a transversely inclined discharge spout 17.

Located within the upper portion of the body portion 5 rearwardly of the cylinder 6, there is a downwardly and rearwardly inclined, transversely extending retarding plate 18 having its lower edge curved rearwardly as indicated at 18' and lying in close relation to the shaker 9. As will be seen from the drawings, this plate 18 will be engaged by straw from the cylinder 6 and concave 8, to retard the straw in its passage over the shaker 9, thus insuring a maximum agitation of the straw to separate the loose grain therefrom.

From the shaker 9, the straw passes to the shaker 10 and thence from the rearward end of the machine, the return pan 11 receiving loose grain from the straw upon the shaker 10, and discharging such grain on to the bed 12.

From the bed 12, the grain passes to the sieve 13, where chaff and other waste matter is separated therefrom by the blast from the blower 15, the grain passing from the sieve to the bottom 16 of the trunk, and thence to the discharge chute 17.

At the rearward end of the trunk, there is a discharge chute 19 located to receive matter too large to pass through the screen 13, and too heavy to be blown therefrom, it being understood that the screen is mounted for reciprocating motion to discharge such matter from its rearward end.

The retarding plate 18 is provided at its upper end with an attaching portion 20 which is formed by bending a portion of the plate at right angles, and this portion of the plate is thus disposed above the threshing cylinder 7 and may be attached to the top of the body portion 5 in any convenient manner. By the arrangement of the curved lower end of the plate 18 it will be seen that a lip 18'' is provided which extends upwardly and toward the rear of the body portion 5, as shown. The provision of this lip 18'' is such that straw will jam there against in a return movement of the shaker 9 to hold the straw between the curved portion 18' and the shaker 9 and thus insuring a thorough agitation of the straw.

The straw etc., is very gently grasped and detained between the smooth convex edge of the deflector and the carrier, the teeth of which pull away and thin out the straw to permit escape of grain.

What is claimed is:

The combination in a threshing machine, of the frame and casing, the threshing cylinder and concave, and the reciprocating straw carrier having a serrated working surface, and a deflecting plate having a bent upper edge whereby it is secured to the frame, an inclined surface facing the threshing mechanism, and a lower edge curved to form a convex surface engaging the straw etc., as it is pulled away from the cylinder, whereby the upper portion of the threshed material is slightly retarded by the convex edge of the deflector while the lower portions thereof are pulled away by the serrated surface of the carrier to permit the escape of the grain.

In testimony whereof I affix my signature, in presence of two witnesses.

GEORGE KLEIN.

Witnesses:
J. P. NEWBURY,
J. C. WEIXEL.